United States Patent [19]

Ivens et al.

[11] 4,199,044
[45] Apr. 22, 1980

[54] DISC ASSEMBLIES FOR VEHICLE DISC BRAKES

[75] Inventors: Cyril Ivens, Claverdon; John C. Watson, Birmingham, both of England

[73] Assignee: Girling Limited, Birmingham, England

[21] Appl. No.: 902,249

[22] Filed: May 2, 1978

[30] Foreign Application Priority Data

May 5, 1977 [GB] United Kingdom ............... 18799/77

[51] Int. Cl.² ............................................. F16D 65/12
[52] U.S. Cl. .......................... 188/218 XL; 192/70.13; 192/107 R
[58] Field of Search .................... 188/73.2, 218 XL; 192/107 R, 107 C, 70.13

[56] References Cited

U.S. PATENT DOCUMENTS

| | | | |
|---|---|---|---|
| 2,423,882 | 7/1947 | Frank | 188/218 XL |
| 3,430,741 | 3/1969 | Meredith | 188/218 XL |
| 3,483,953 | 12/1969 | Bender | 192/107 R |
| 3,618,729 | 11/1971 | Ely et al. | 188/218 XL X |
| 3,804,213 | 4/1974 | Lucien et al. | 188/218 XL X |

FOREIGN PATENT DOCUMENTS

| | | | |
|---|---|---|---|
| 2552105 | 6/1976 | Fed. Rep. of Germany | 188/218 XL |
| 321650 | 1/1972 | U.S.S.R. | 188/218 XL |

*Primary Examiner*—George E. A. Halvosa
*Attorney, Agent, or Firm*—Scrivener, Parker, Scrivener and Clarke

[57] ABSTRACT

In a disc assembly for a vehicle disc brake, the assembly comprises a rotor, with brake rings secured to one or both of a pair of opposite faces of the rotor by bolts passing through clearance openings in the rotor. Each brake ring comprises at least two segments, with clearances provided between adjacent radial ends of the segments. The segments are coupled by pivotal links, and a single pivotal connection is provided between each segment and the rotor. The pivotal connection is located to one side of a radius of the disc bisecting the segment, and the segments, links, and pivotal connections are constructed and arranged to maintain the disc assembly in balance irrespective of centrifugal, shock, or expansive forces.

10 Claims, 6 Drawing Figures

DISC ASSEMBLIES FOR VEHICLE DISC BRAKES

SPECIFIC DESCRIPTION

This invention relates to disc assemblies for vehicle disc brakes of the kind in which a brake ring is secured to one or both of a pair of opposite faces of a rotor, such as a supporting wheel of a rail vehicle, by bolts or other fasteners which are passed through clearance openings in the rotor and are stressed substantially only in tension, so that braking torque is transmitted by frictional engagement between the ring or rings and the rotor, thermal expansion being accommodated by movement of the ring or rings and the bolts relative to the rotor.

A disc assembly of the kind set forth is described in our U.K. Patent Specification No. 1 136 426 and, in the preferred construction, the or each ring consists of two or more separate segments with clearances provided between the adjacent radial ends of adjoining segments so that thermal, centrifugal or braking forces and shock loads are transmitted through one segment to another only through the rotor. In practice each segment also has to be keyed locally to the rotor to maintain the disc assembly in balance. Hitherto, this has been achieved by a pair of dowelbolts of which the shanks are close fits in openings both in the segment and the rotor, and are located at circumferentially and/or radially spaced positions. Preferably the dowelbolts of each pair are spaced circumferentially on opposite sides of a diameter passing through substantially the mid-point in the circumferential length of each segment so that the segment tends to increase in size and straighten under the effects of thermal expansion and centrifugal forces respectively. When thermal expansion and the centrifugal forces are considerable, for example when heated to the considerable temperatures experienced at the high rotation speeds of wheels of high speed trains, the region of the segment between the dowelbolts expands by an amount sufficient to apply shear forces to the bolts which cause the portions of the shanks received in the segment to move away from each other. The bolt shanks adopt a permanent stepped configuration. Due to the bending stresses set up this deformation of the dowelbolts may cause a free end threaded portion carrying a nut for clamping the segment against the rotor to shear from the deformed portion. This deformation hinders ring replacements since mis-shaped holes in the segment through which the bolts are passed have to be re-reamed, and larger diameter bolts have to be fitted.

According to our invention, in a disc assembly of the kind set forth the or each ring comprises at least two segments with clearances provided between adjacent radial ends of adjoining segments which are coupled by pivotal links and a single pivotal connection is provided between each segment and the rotor, at a point to one side of a radius of the disc which bisects the segment, the segments, links and pivotal connections being so constructed and arranged as to maintain the disc assembly in balance irrespective of centrifugal shock or expansive forces.

Preferably the segments, links and pivotal connections are symmetrically arranged.

Each segment is free to expand radially and/or circumferentially without applying shear forces to the pivotal connection, and any tendency for a segment to move angularly about its pivotal connection is resisted by the pivotal link connected to the end of the segment to the opposite side of the said radius.

Preferably the pivotal connections are located at corresponding ends of the segments, with the pivotal connection for one segment being located at the end of that segment which is adjacent to the free or non-pivotal end of the adjoining segment.

It follows therefore that each segment is able to expand both radially and circumferentially but expansion at the free non-pivotal end of each segment is constrained by the link at the end to maintain a balanced disc assembly.

In a preferred construction the or each ring comprises two segments.

Conveniently each pivotal connection comprises a dowel-bolt or sleeve of which the shank is a close fit in the segment and in the rotor, and each link incorporates a pair of spaced part-circular bosses which are rotatably received in regions of complementary outline in recesses in the adjacent ends of adjoining segments.

In one construction the links are of dumb-bell outline and each pair of recesses is of a similar configuration, but include suitable clearances to permit limited angular movement of the links and the segments.

When brake rings are secured to opposite sides of a rotor the segments on one side are superimposed upon those on the other and one pivotal connection connects a pair of superimposed segments to the rotor. The pivotal connections may comprise dowelbolts which are passed through and are close fits in aligned openings in both segments and the rotor.

In an alternative construction each pivotal connection may also pass through an opening in the respective link or links.

One embodiment of our invention is illustrated in the accompanying drawings in which.

Figure 1:
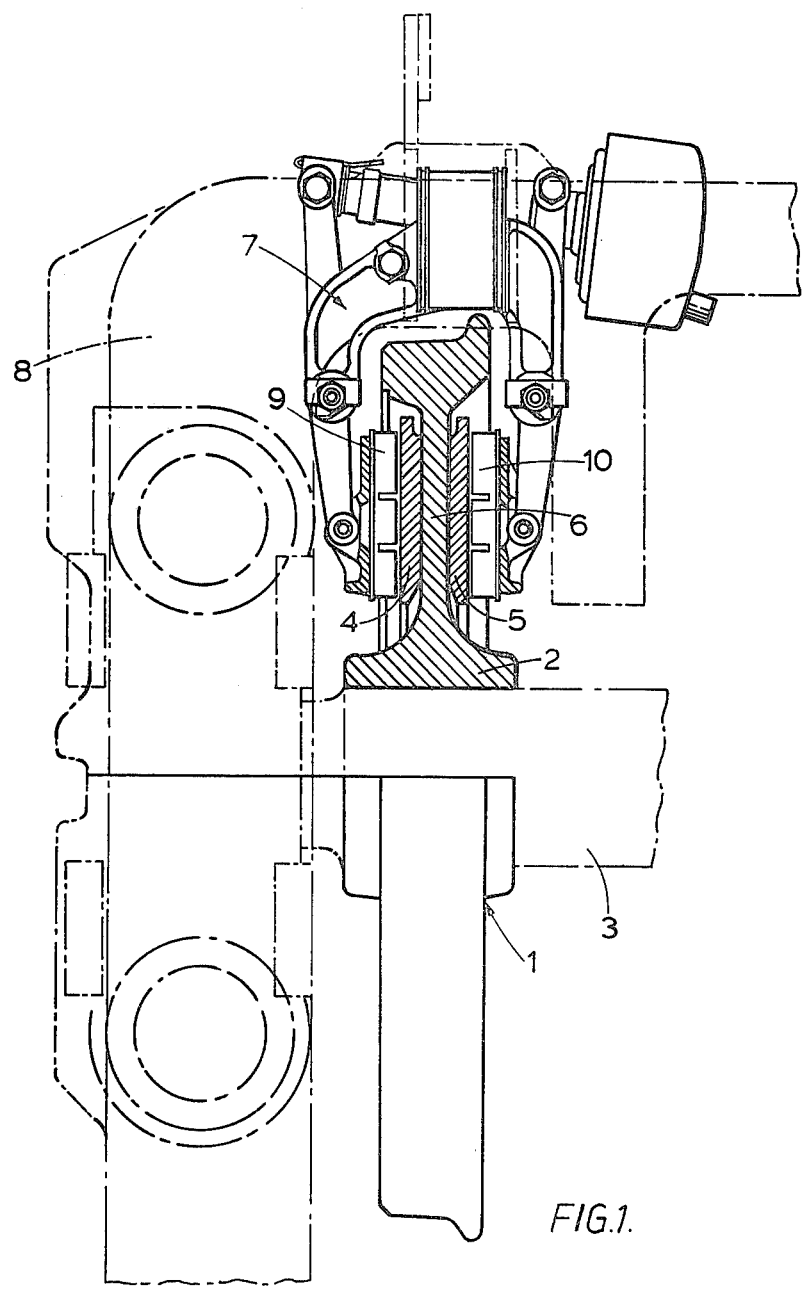
FIG. 1 is a plan view of a disc brake for a rail vehicle including a transverse half section through the disc assembly.
Figure 2:
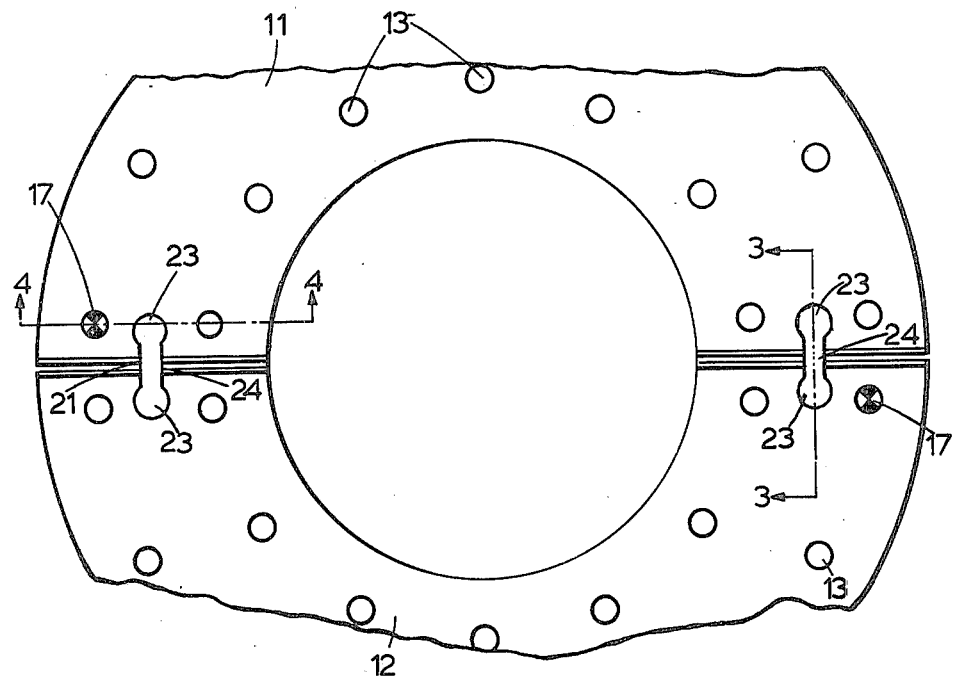
FIG. 2 is a side view of one ring.

The disc brake illustrated in the drawings comprises a disc assembly 1, suitably a rotor 2 in the form of a wheel which is rotatably mounted on an axle 3, and a pair of brake rings 4, 5 which are secured to opposite sides of a central web 6 of the wheel.

A caliper brake actuator mechanism 7 is mounted on a stationary part 8 adjacent to the wheel to apply opposed friction pads 9, 10 to the outer faces of the brake rings 4, 5.

Each ring 4, 5 comprises a pair of segments 11, 12 which are formed by removing a section on a diameter of each ring. Thus the two adjoining segments 11, 12 are spaced from each other at adjacent ends.

The segments on opposite sides of the rotor 2, are superimposed upon each other, and all four segments 11 and 12 are formed with a plurality of openings 13 which are counterbored at their outer ends. The openings 13 in the ring 4 are threaded to receive the threaded ends of bolts 14, and lock nuts 15 are provided at the outer ends of the bolts 14.

The bolts 14 pass with substantial clearance through openings 16 in the rotor 2 and openings 13 in the ring 5, and are tightened sufficiently to ensure good friction engagement between the plane inner faces of the rings 4 and 5 and the mating faces of the web 6.

A single dowelbolt 17, comprising a pivotal connection, is passed through openings 18 which are counterbored at their outer ends and are adjacent to one end of each pair of superimposed segments 11 and 12 and through an opening 19 in the rotor 6. Each dowelbolt is a close fit in all three openings and a nut 20 is screwed onto the free end of the bolt 17 to retain it in position. This also enhances the frictional engagement between the rings 4 and 5 and the rotor 2.

Figure 5:
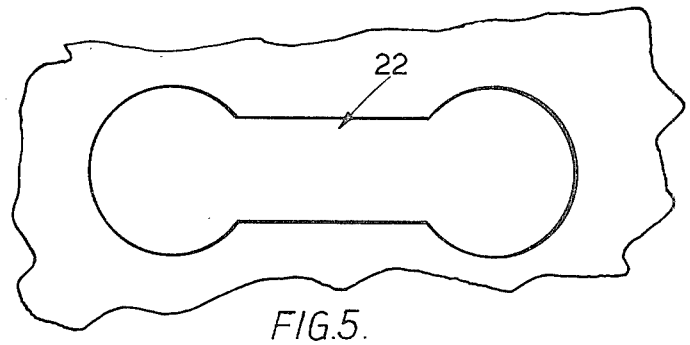
FIG. 5 is a side elevation of a cut in a ring to receive a link.

The free non-pivotal end of each segment is connected to the adjoining segment of that ring at the end carrying the pivotal connection by means of a pivotal link 21. The links 21 are dumb-bell outline and are received in recesses 22 of substantially complementary outline in the rings 4 and 5 on the sides for mating engagement with the rotor 6. Specifically the links 21 comprise part-circular bosses 23 which are interconnected by an integral web 24 and the recesses 22 are of complementary outline as shown in FIG. 5 which shows the outline of a recess in a complete ring before it is machined as described above to form the segments.

Upon braking the rings 4 and 5 can expand radially, relative to the rotor 2, without the bolts 14 contacting the edges of the openings 16 in the rotor, and the braking torques are transmitted solely by the frictional engagement of the rings 4, 5 with the rotor 2.

The pivotal connections 17 and the links 21 maintain the balance of the disc assembly, permitting expansion of the segments in radial and/or circumferential directions, with the dowelbolts 17 permitting the segments to pivot and tend to straighten, but with such movement being constrained by the links 21.

In a modification the recesses in each ring can be formed by two circular blind bores in tangential contact with each other and which are separated to form separate part-circular recesses to receive the bosses on the links, after machining the rings to form the two segments. This simplifies the construction and enables the links to be shorter than in the construction illustrated.

Figure 6:
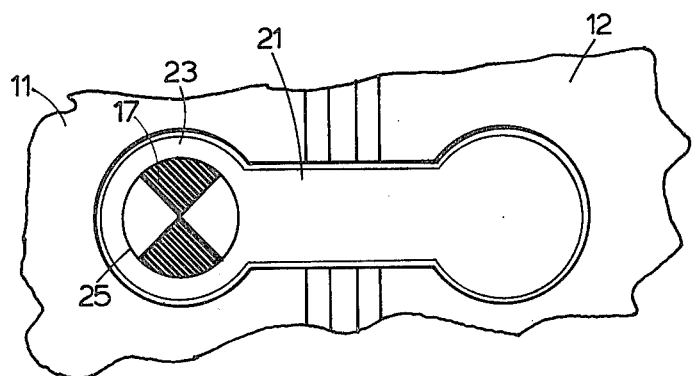
FIG. 6 is a side view of part of a ring showing an alternative arrangement of the pivotal connection and the link.
Figure 3:
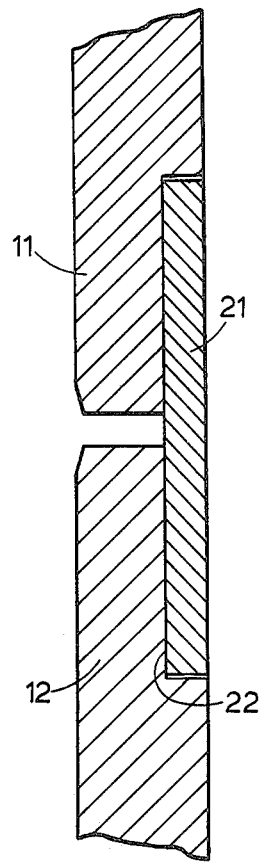
FIG. 3 is a section on the line 3—3 of FIG. 2.
Figure 4:
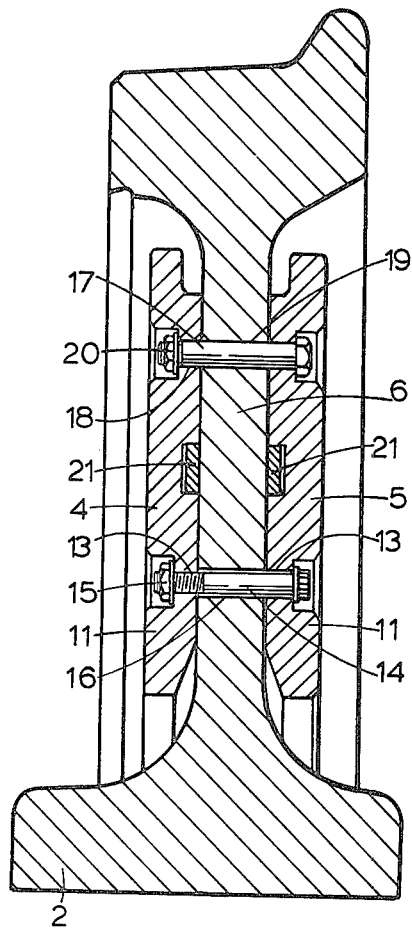
FIG. 4 is a transverse section through one bolt and one pivotal connection of the disc assembly taken on the line 4—4 of FIG. 2.

In a further modification, as shown in FIG. 6, the dowelbolt 17 is located so that it also passes through an opening 25 in one of the part-circular portions 23 of the link 21.

We claim:

1. A disc assembly for a vehicle disc brake, said disc assembly comprising a rotor having opposite faces, a brake ring provided on at least one of said faces of said rotor, said brake ring being secured to said rotor by bolts, said bolts passing through clearance openings in said rotor, said bolts being stressed substantially only in tension, whereby braking torque is transmitted by frictional engagement between said ring and said rotor, said brake ring comprising at least two segments, a single pivotal connection being provided between each said segment and said rotor to locate said segment with respect to said rotor, said pivotal connection being located at a point to one side of a radius of said disc bisecting said segment, clearances being provided between adjacent radial ends of said segments, said segments being coupled by pivotal links permitting limited pivotal movement of said segments about their respective said pivotal connections, said segments, said links and said pivotal connections being constructed and arranged to maintain said disc assembly in balance irrespective of centrifugal, shock or expansive forces.

2. A disc assembly as claimed in claim 1, wherein said segments, said links and said pivotal connections are symmetrically arranged.

3. A disc assembly as claimed in claim 2, wherein said rings comprise two segments.

4. A disc assembly as claimed in claim 1, wherein said pivotal connections are located at corresponding ends of said segments, with said pivotal connection for one segment being located at the end of that segment which is adjacent to the free end of the adjoining segment.

5. A disc assembly as claimed in claim 1, wherein each said pivotal connection comprises a dowelbolt, said dowelbolt having a shank, said shank being a close fit in openings in said segment and said rotor.

6. A disc assembly as claimed in claim 1, wherein each said pivotal link incorporates a pair of spaced part-circular bosses, said bosses being rotatably received in regions of complementary outline, said regions being in recesses in adjacent ends of adjoining segments.

7. A disc assembly as claimed in claim 6, wherein said links are of dumb-bell outline, said part-circular bosses being interconnected by an integral web, and each pair of said recesses being of a similar configuration to said links, said recesses including clearances to permit limited angular movement of said links and said segments.

8. A disc assembly as claimed in claim 1, wherein two brake rings are provided, said brake rings being secured to said opposite faces of said rotor, said segments on a first face of said rotor being superimposed upon said segments on the second face, said single pivotal connection for one said segment on said first face providing said single pivotal connection for said superimposed segment on said second face.

9. A disc assembly as claimed in claim 8, wherein each said pivotal connection comprises a dowelbolt, said bolt being passed through aligned openings in both said superimposed segments and said rotor, said bolt being a close fit in said openings, a nut being screwed onto the free end of said bolt.

10. A disc assembly as claimed in claim 1, wherein each said pivotal connection passes through an opening in said respective link.

* * * * *